Jan. 19, 1960   W. O. W. PANKEY ET AL   2,921,354
APPARATUS FOR MAKING PRECAST CONCRETE BRIDGES OR THE LIKE
Filed March 12, 1956   6 Sheets-Sheet 1
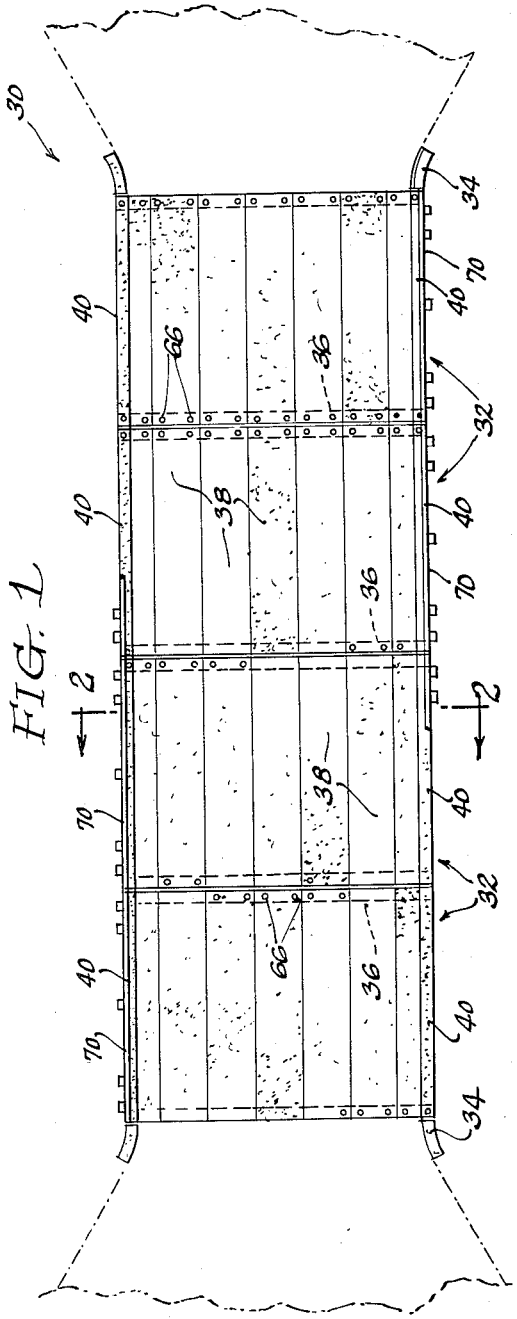
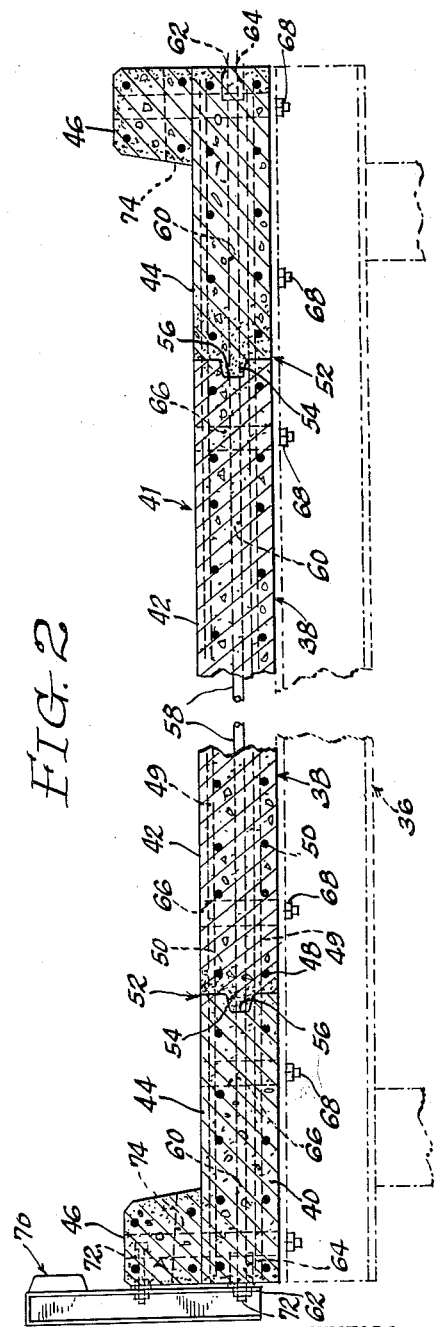
INVENTORS
William O. W. Pankey
Roy A. Wasson
BY Ooms, McDougall,
Williams & Hersh
Attorneys Jan. 19, 1960 W. O. W. PANKEY ET AL 2,921,354
APPARATUS FOR MAKING PRECAST CONCRETE BRIDGES OR THE LIKE
Filed March 12, 1956 6 Sheets-Sheet 2
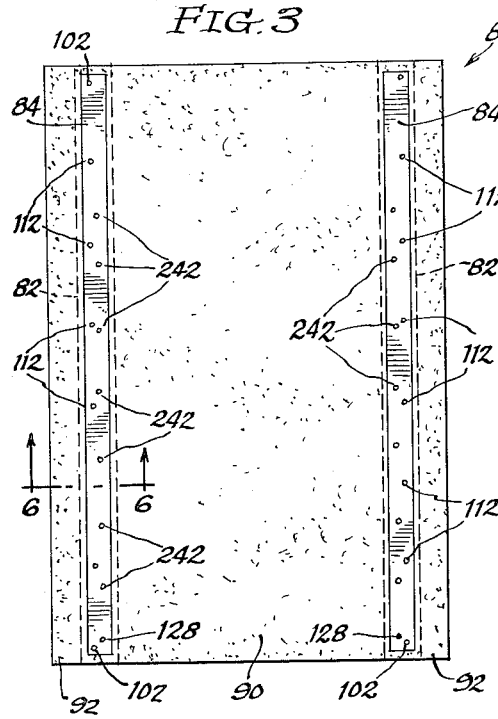
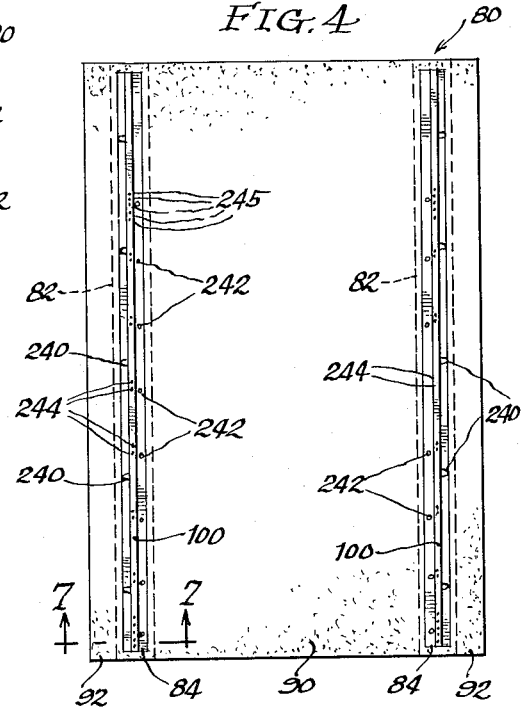
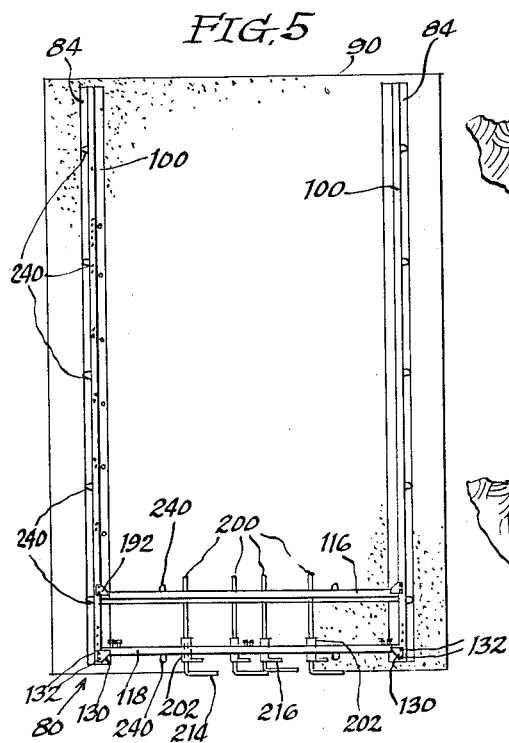
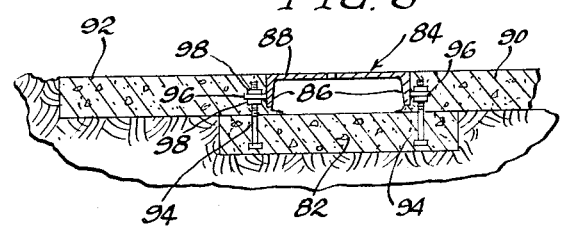
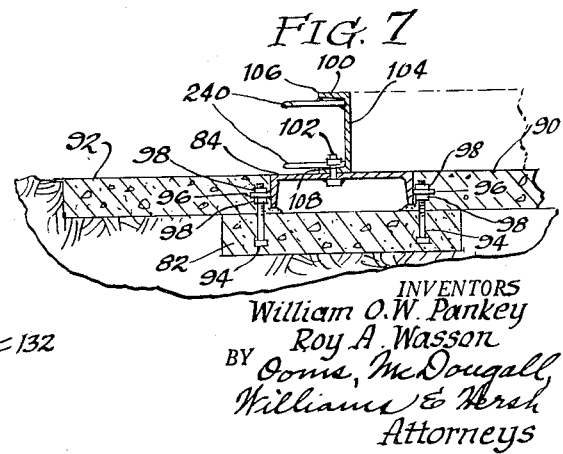
INVENTORS
William O. W. Pankey
Roy A. Wasson
BY
Attorneys

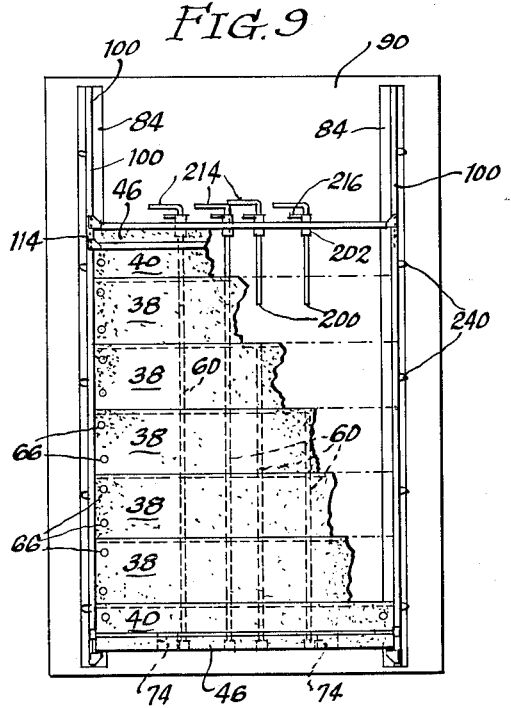
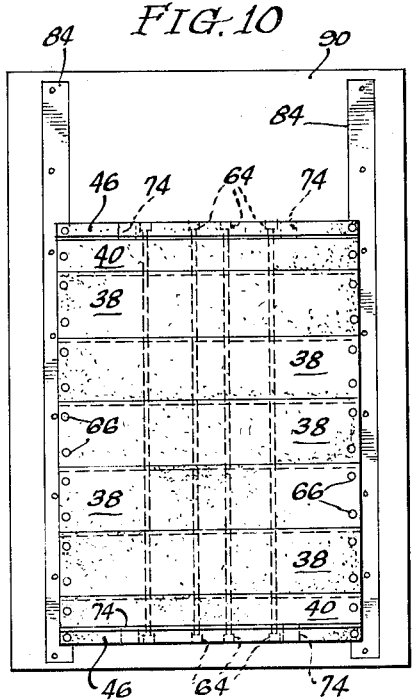
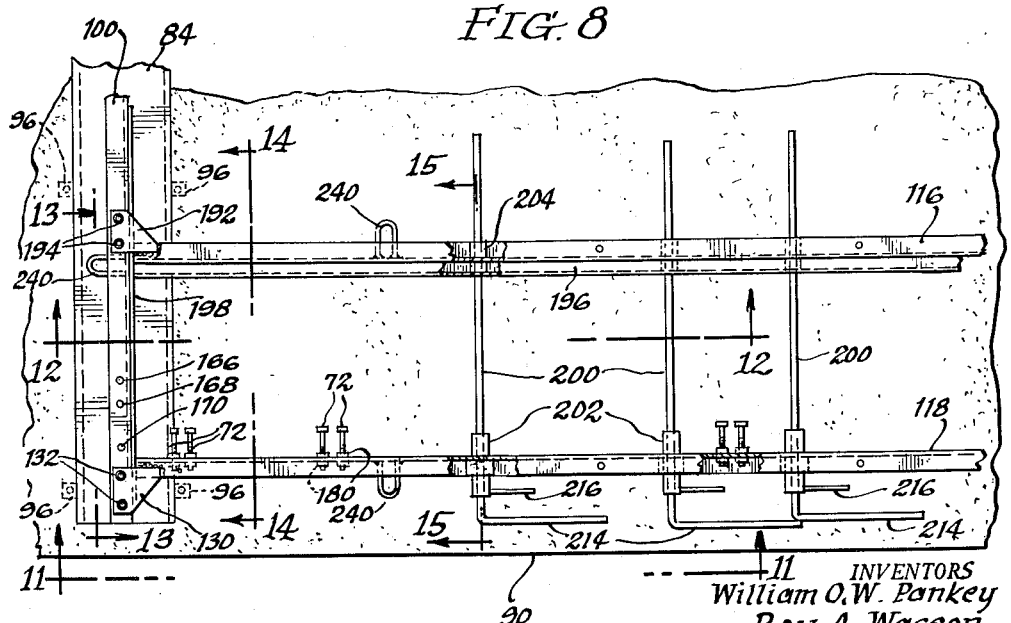

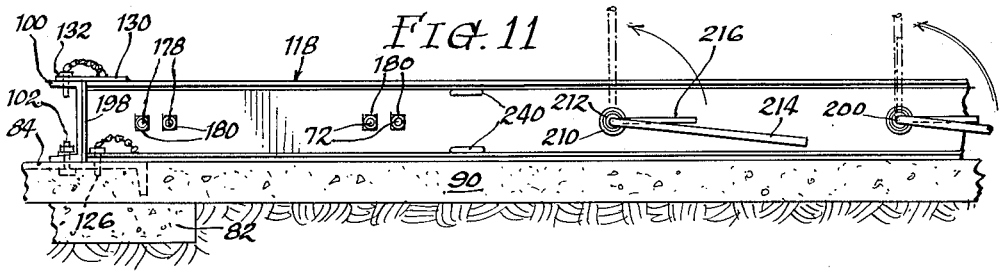
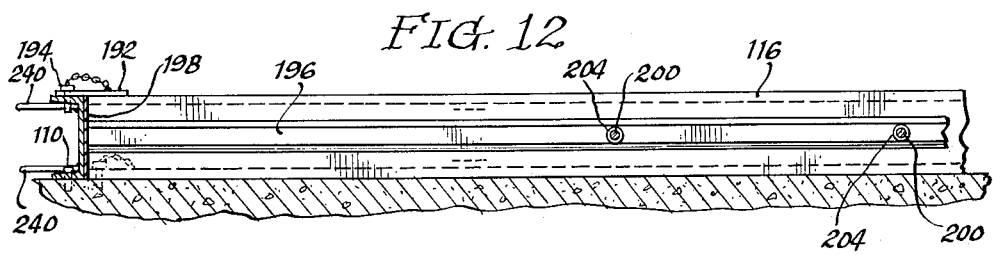
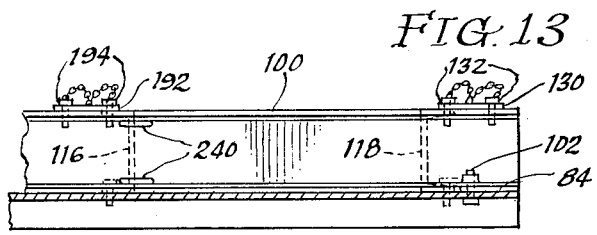
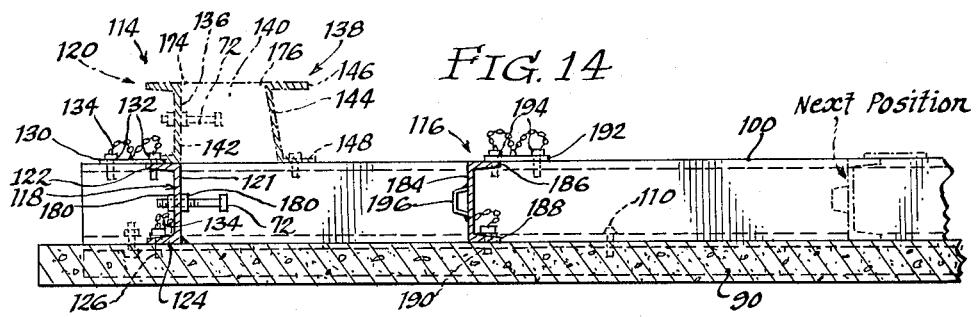
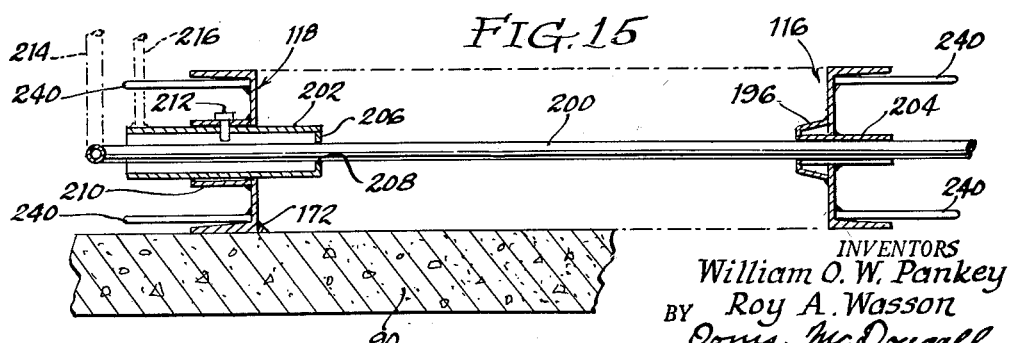

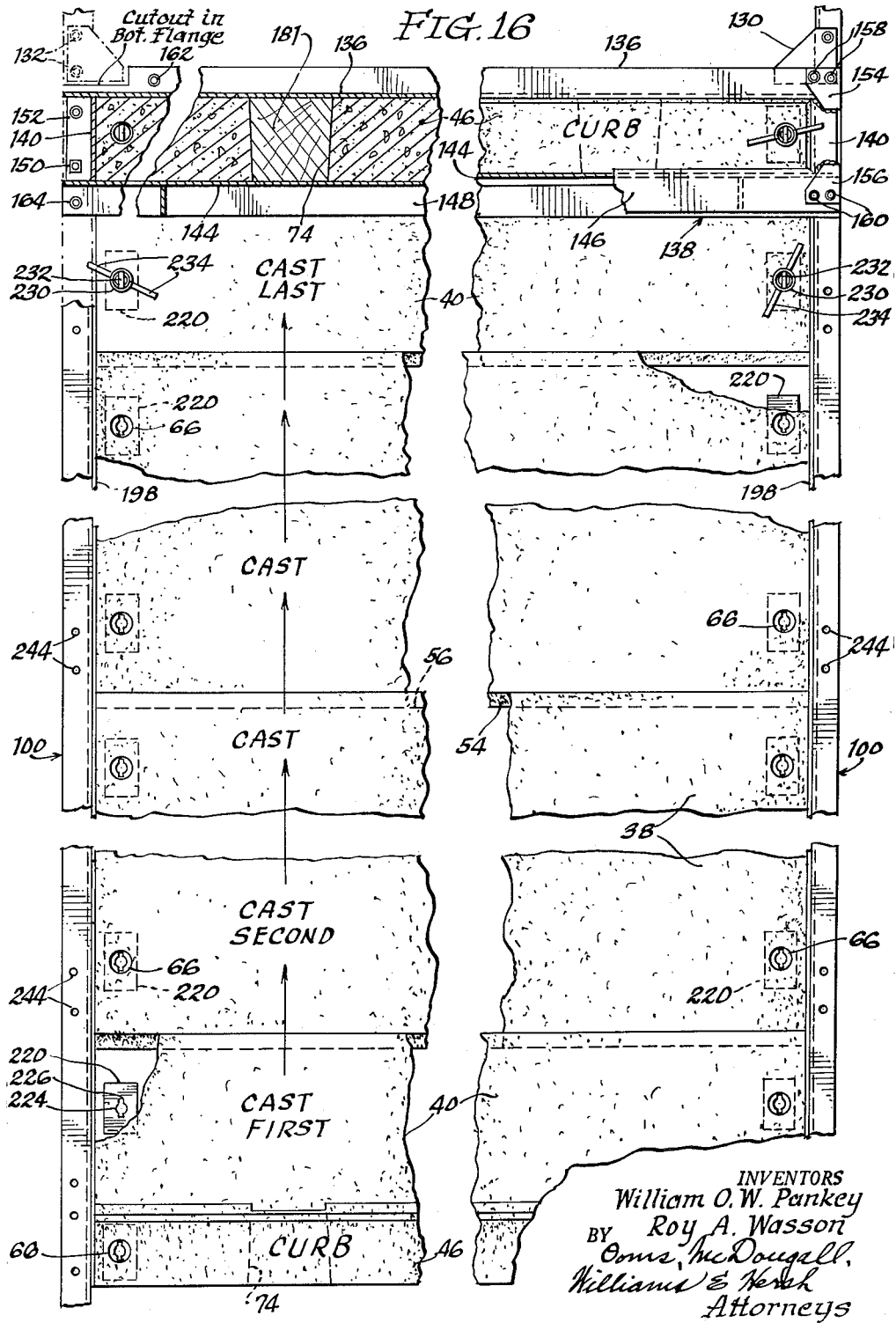

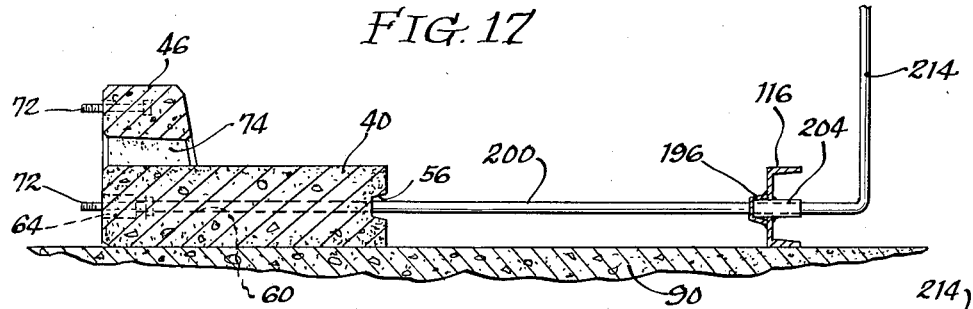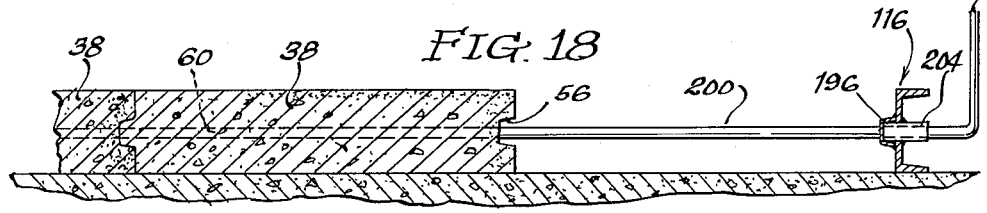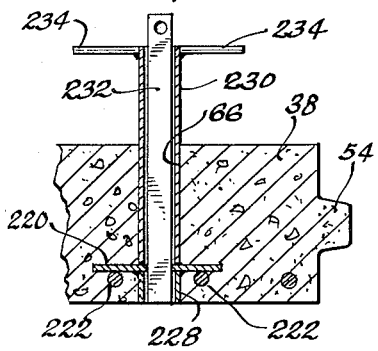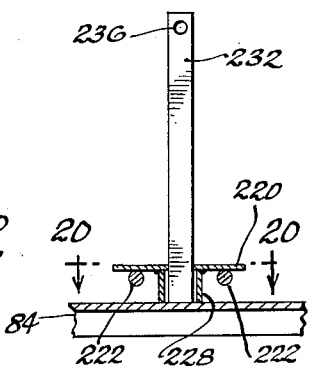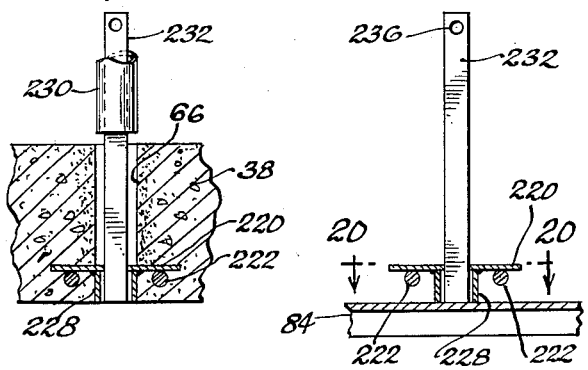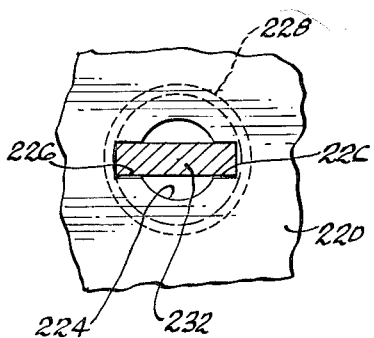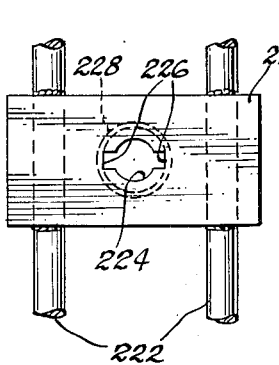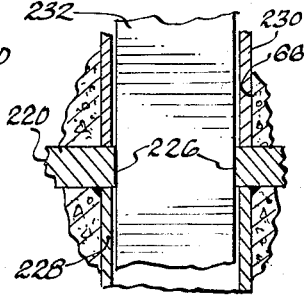

United States Patent Office 2,921,354
Patented Jan. 19, 1960

2,921,354

APPARATUS FOR MAKING PRECAST CONCRETE BRIDGES OR THE LIKE

William O. W. Pankey and Roy A. Wasson,
Baton Rouge, La.

Application March 12, 1956, Serial No. 570,747

2 Claims. (Cl. 25—118)

This invention relates to an apparatus for making precast concrete bridges or the like, such as bridges of the type disclosed and claimed in the copending application of William O. W. Pankey and Roy A. Wasson, Serial No. 477,503, filed December 24, 1954 and entitled "Bridge and Method of Building Same."

One object of the present invention is to provide a new apparatus whereby a bridge span or the like may be precast in the form of a series of reinforced concrete slabs adapted to be assembled side by side with interfitting tongue and groove joint elements therebetween.

A further object is to provide a new apparatus whereby the tongue and groove joint elements will be formed with great accuracy so that the slabs will be fully interchangeable and so that the mating joint elements will fit perfectly.

It is another object to provide a new apparatus whereby the bridge span may be formed with a slight crown, either longitudinally, transversely or both, so that the span will be level under its own dead weight and so that water will drain off the finished span.

A further object is to provide an apparatus whereby special slabs may be cast with curbs thereon for assembly with the deck slabs at the edges of the span.

It is another object to provide a new apparatus whereby apertures may be formed in the slabs to receive clamping cables and anchoring bolts, and whereby studs may be cast into some of the slabs for supporting railings or the like.

A further object is to provide bridge precasting apparatus of the foregoing character which will be easy and inexpensive to construct yet will be effective and convenient in operation.

Further objects and advantages of the present invention will appear from the following description, taken with the accompanying drawings, in which:

Fig. 1 is a plan view of one type of bridge that may be made in accordance with the present invention, the illustrated bridge being constructed with four spans, each comprising five deck slabs and two curb slabs which may be precast by the illustrative method and apparatus to be described.

Fig. 2 is a transverse elevational sectional view taken through the bridge, generally along a line 2—2 in Fig. 1.

Fig. 3 is a plan view of a pad or bed employed as part of the illustrative precasting apparatus.

Fig. 4 is a plan view of the pad of Fig. 3 with a pair of end forms added.

Fig. 5 is a further plan view, similar to Fig. 4 but with a lower curb form and a side form added.

Fig. 6 is a fragmentary enlarged elevational sectional view taken along a line 6—6 in Fig. 3.

Fig. 7 is a fragmentary enlarged elevational sectional view taken generally along a line 7—7 in Fig. 4.

Fig. 8 is a fragmentary enlarged plan view similar to the lower left hand portion of Fig. 5.

Fig. 9 is a plan view of the illustrative precasting apparatus after several slabs have been cast, but with the forms still in position.

Fig. 10 is a plan view of the illustrative precasting apparatus with a completed bridge span thereon but with the forms removed, preparatory to removal of the slabs from the pad.

Fig. 11 is an elevational sectional view, taken generally along a line 11—11 in Fig. 8, and showing the lower curb form in elevation.

Fig. 12 is an elevational sectional view taken generally along a line 12—12 in Fig. 8 and showing the side form in elevation.

Fig. 13 is an elevational sectional view taken generally along a line 13—13 in Fig. 8 and showing the outside of the end form in elevation.

Fig. 14 is an elevational sectional view taken generally along a line 14—14 in Fig. 8 to show the curb form and the side form in transverse section while showing the inside of the end form in elevation.

Fig. 15 is an enlarged elevational sectional view taken generally along a line 15—15 in Fig. 8, to show the means for forming cable holes and recesses in the slabs.

Fig. 16 is an enlarged fragmentary plan view showing the precasting apparatus with a finished span and the forms in place, the upper curb form being shown partly in horizontal section.

Fig. 17 is an elevational sectional view taken transversely to the side form and showing the manner in which the side form and the curb slab are employed for precasting the first deck slab.

Fig. 18 is a view similar to Fig. 17 but showing the manner in which the side form is arranged for casting successive deck slabs.

Fig. 19 is an elevational sectional view taken through a bolt-down plate, several of which are embedded in each slab, a guide bar being shown in place in the plate.

Fig. 20 is a fragmentary horizontal sectional view taken generally along a line 20—20 in Fig. 19.

Fig. 21 is a fragmentary plan view showing the bolt-down plate, but with the guide bar removed therefrom.

Fig. 22 is an elevational sectional view showing the assembly of Fig. 19 with a bolt-hole form in place over the guide bar and with the slab cast around the bolt-down plate and the bolt-hole form.

Fig. 23 is an enlarged fragmentary sectional view similar to the lower portion of Fig. 22.

Fig. 24 is a sectional view similar to Fig. 22 but illustrating the removal of the bolt-hole form.

As already indicated, Figs. 1 and 2 illustrate one type of bridge 30 adapted to be constructed with the aid of the present invention. The illustrated bridge 30 is of the type disclosed in the above mentioned Pankey and Wasson application, Serial No. 477,503, to which reference may be had for a detailed description. Briefly, however, the bridge 30 comprises a plurality of spans 32 which extend between suitable transverse supports, such as the illustrated end piers 34 and bents 36. Four spans 32 are illustrated, but it will be understood that any desired number of spans could be provided.

Each of the illustrated bridge spans 32 comprises a plurality of longitudinal deck slabs 38 and a pair of curb slabs 40. A roadway 41 is defined by generally horizontal upper surfaces 42 and 44 on the deck slabs 38 and the curb slabs 40, respectively. It will be seen that the upper surfaces 42 extend for the full width of the deck slabs 38, while the upper surfaces 44 cover only the inner portions of the curb slabs 40. Curbs 46 are formed on the outer portions of the curb slabs 40 and are arranged to project above the roadway 41.

It will be seen that the slabs 38 and 40 constitute the sole supporting members extending between the transverse piers 34 and bents 36. In other words, the slabs 38 and 40 support their own dead weight plus the working load of the bridge. To give the slabs sufficient strength to support this load, reinforcing bars, cables or other tension elements 48, 49 and 50 are cast into the slabs. It will be seen that the bars 48 and 50 extend longitudinally, while the bars 49 extend transversely of the slabs.

The bridge 30 is greatly strengthened by providing interlocking joints 52 between the adjacent slabs 38 and 40. It will be noted that the slabs 38 and 40 are arranged edge to edge so that the roadway surface 41 will be unbroken. As illustrated, each of the interlocking joints 52 comprises a male element or tongue 54 formed on the edge of one slab and received in a female element or groove 56 formed in the edge of the adjacent slab. Thus, each of the deck slabs 38 has a tongue 54 on one edge and a groove 56 in the opposite edge, elements of opposite sex thus being formed on the edges. One of the curb slabs 40 has a tongue 54 on its inner edge, while the other has a groove 56 in its inner edge. The illustrated tongues and grooves 54 and 56 are tapered in form so that they may be assembled easily, yet will fit together tightly so as to form immovable joints. By virtue of this arrangement of the tongues and grooves 54 and 56, the joints 52 are effective to transfer working loads between the various slabs 38 and 40 so that any load applied to one slab will be shared by the neighboring slabs. In this way, the strength and rigidity of the bridge are greatly enhanced. Moreover, the tapering tongues and grooves 54 and 56 maintain precise alignment between the slabs and prevent any relative vertical movement between adjacent slabs.

In order that all of the joints 52 may be tight, the slabs 38 and 40 are clamped or compressed together laterally. In the illustrated case, this is done by a plurality of tensioned cables 58 or other tension elements, strung through lateral apertures 60 formed in the slabs 38 and 40. When the bridge 30 is assembled, the cables 58 are drawn up tight, with considerable tension, and are anchored at their ends by anchoring elements 62 received in recesses 64 which are formed at the ends of the apertures 60 in the curb slabs 40. Holes 66 are formed in the ends of the slabs 38 and 40 to receive bolts or the like 68 which secure the slabs to the end piers 34 and bents 36. The upper ends of the holes 66 may be filled with cement grout or asphalt mastic, to smooth off the roadway, after the bolts have been tightened.

Guard railings 70, shown in fragmentary fashion in Figs. 1 and 2, may be mounted on the curb slabs 40 by means of threaded studs or bolts 72 embedded in the slabs. It will be seen that openings 74 are formed in the curbs 46 to drain water from the edges of the roadway 41.

Figs. 3–24 illustrate precasting apparatus 80 adapted to precast the slabs 38 and 40 of the spans 32. The precasting apparatus 80 may be set up at any suitable yard, preferably having one or more cranes or the like, adapted to lift the heavy slabs and the components of the precasting apparatus, as well as concrete mixing equipment for supplying fresh concrete.

In constructing the precasting apparatus 80, it is preferred to lay a pair of footings 82 extending parallel to each other and spaced apart by a distance corresponding generally to the desired length of the bridge spans 32 to be precast. The length of the footings 82 corresponds generally to the width of the spans 32 and is made great enough to precast spans of the greatest contemplated width. Narrower spans can readily be precast, as will appear shortly.

The footings 82 serve as supports for metal base members or rails 84. As shown, the base members 84 take the form of channel members with their flanges 86 directed downwardly and their broad, flat faces 88 directed upwardly. It will be seen that the base members 84 serve as leveling grounds for a concrete pad or bed 90 cast therebetween. Concrete ribbons 92 may also be laid outside the base members 84 to support the workmen and their equipment.

In order to give the finished bridge spans 32 a slight transverse crown so as to provide for drainage of water from the bridge, it is preferred to mount the base members 84 so that they will have a slight upward arch. Of course, the base members 84 must be given their upward arch before the pad 90 and ribbons 92 are laid. In laying the pad 90, the base members 84 are employed as leveling grounds so that the pad will have the same arch or crown as the base members. Those skilled in the art will understand that the top of the pad is smoothed by placing a levelling member between the base members 84 and sliding the levelling member along the length of the base members. The levelling member scrapes away the excess concrete, leaving the pad with a top surface which has a crown like that of the members 84. Of course, the concrete must have a sufficiently thick or heavy consistency (low enough slump) to enable it to retain the crown without slumping flat.

In this instance, the upward arch or crown is given to the metal base members 84 by mounting them on threaded studs or bolts 94 having their lower ends embedded in the footing 82. The flanges 86 of the base members are provided with horizontal, apertured ears or lugs 96 which are adapted to receive the threaded upper ends of the bolts 94. Two nuts 98 are provided on each of the bolts 94, one nut being above and the other below the corresponding ear 96 to prevent upward and downward movement of the ear. Several of the bolts 94 are provided along the length of each of the base members 84. By adjusting the nuts 98, it is a simple matter to flex or bend the members 84 so as to give them the desired upward crown, the ends of the members being forced downwardly by some of the nuts while other nuts support the center portion of the members at a higher elevation to form the crown.

It is also generally desirable to give the pad 90 a slight upward crown or arch between the base members 84 so that the slabs 38 and 40 will be precast with a slight longitudinal crown, sufficient to compensate for the dead weight deflection of the slabs. This upward arch may be produced by smoothing the pad 90, when originally laid, with a levelling member having a slightly arched lower edge.

In the illustrated apparatus, the ends of all of the slabs 38 and 40 in the bridge span 32 are formed by a single pair of end forms 100, extending along the metal base members 84. Bolts 102 may be provided to anchor the ends of each end form 100 to the base member 84. It will be seen that the illustrated end forms 100 take the form of channel members with flat surfaces 104 directed inwardly toward the pad 90. Each of the end forms 100 has upper and lower flanges 106 and 108 directed outwardly. The lower flange 108 is apertured to receive the bolts 102, which have their lower ends welded or otherwise secured to the base members 84. To prevent lateral bulging of the end forms 100, the lower flanges 108 and the base members 84 are apertured to receive a series of pintle bolts 110 (Figs. 12 and 14). The apertures 112 formed in the base members 84 to receive the pintle bolts 110 are clearly shown in Fig. 3. It will be understood that the end bolts 102 are tightened so that the end forms 100 will be flexed or bent so as to give them the same crown as the base members 84. The tightening of the bolts forces the ends of the end forms downwardly while the center portions of the end forms are supported by the slightly arching central portions of the base members 84.

In precasting the span 32, one of the curb slabs 40 is cast first. For this purpose, a curb form 114 (Fig. 14) and a side form 116 are arranged to extend between the end forms 100. Both forms 114 and 116 are perpendicular to the end forms 100. The curb form 114 is connected between the end forms 100 adjacent one end thereof, while the side form 116 is spaced from the curb form 114 by an amount corresponding to the desired width of the curb slab 40.

In this instance, the curb form 114 is made in two readily separable components, a lower curb form 118 and an upper curb form 120, both of which may easily be attached to and removed from the end forms 100. The lower curb form 118 is illustrated as a channel member, although it may assume various forms. As shown, the lower curb form 118 has a flat face 121 directed inwardly and upper and lower flanges 122 and 124 directed outwardly. The lower flange 124 and the base members 84 are apertured to receive pintle bolts 126, one at each end of the lower curb form 118. Fig. 3 clearly illustrates the apertures 128 formed in the base members 84 for the pintle bolts 126.

To prevent tilting of the lower curb form 118, the upper flange 122 thereof is connected to the upper flanges of the end forms 100. In the illustrated arrangement, this is done by welding or otherwise securing a pair of generally triangular gusset plates 130 to the upper flange 122 of the lower curb form 118. The plates 130 are arranged to overlap the upper flanges 106 of the end forms 100. It will be seen that the plates 130 and the flanges 106 are apertured to receive pintle bolts 132. Loss of the various pintle bolts may be prevented by connecting chains 134 between the bolts and the corresponding forms. Thus, the chains 134 for the pintle bolts 126 and 132 extend between the bolts and the lower curb form 118.

In order to give the curb portion 46 of the curb slab 40 the desired shape, the upper curb form 120 is made with an outer member 136, an inner member 138 and end members 140. The form of these members may be varied, but the illustrated outer member 136 takes the form of a laterally flanged, upright channel member having its flat face 142 directed inwardly. The illustrated inner member 138 is also channel shaped in cross section, but is welded or otherwise fabricated from plates so as to provide a wall 144 which stands at a slight angle to the vertical. The angle of the wall 144 corresponds to the desired inner slope of the curb 46. Upper and lower flanges 146 and 148 project inwardly from the wall 144 to enhance the rigidity of the inner member 138.

As shown, the end members 140 are in the form of short, upright, outwardly flanged channels which are detachably connected to the end forms 100 and the inner and outer members 136 and 138. The lower flange of each end member 140 and the corresponding end form 100 are apertured to receive a single bolt 150. In addition, the end forms 100 and the lower flanges of the end members 140 are apertured to receive pintles 152. Outer and inner gusset plates 154 and 156 are welded or otherwise secured to the uper flanges of the end members 140 and are arranged to overlap the upper flanges of the outer and inner members 136 and 138. The rear plate 154 and the rear member 136 are apertured to receive a pair of pintles 158. Likewise, the front plate 156 and the front member 138 are apertured to receive the pintles 160.

It will be seen from Figs. 14 and 16 that the outer member 136 of the upper curb form 120 is supported on the lower curb form 118. The lower flange of the member 136 and the upper flange of the lower curb form 118 are apertured to receive two or more pintle bolts 162, which maintain the member 136 and the form 118 in accurate alignment.

From Figs. 14 and 16 it will be seen that the lower flange 148 of the front member 138 is suported by the end forms 100. The lower flange 148 and the upper flanges of the end forms 100 are apertured to receive pintle bolts 164. In Fig. 8, the aperture for the pintle bolt 164 is shown at 166. The apertures for the bolt 150 and the pintle 152 are shown at 168 and 170.

To provide chamfers on the exposed corners of the curb slab 40, the lower and upper curb forms 118 and 120 are provided with three generally triangular chamfer strips 172, 174 and 176. The strip 172 is welded or otherwise secured to the lower edge of the lower curb form 118, while the strips 174 and 176 are mounted along the upper edges of the inner and outer members 136 and 138.

Provision is made for supporting the anchoring bolts 72 for the guard railings 70, so that the bolts 72 will be embedded in the curb slab 40. To this end, the lower curb form 118 and the outer member 136 of the upper curb form 120 are formed with a series of apertures 178 adapted to receive the bolts 72, which may be mounted in the apertures by means of nuts 180 threaded onto the bolts on opposite sides of the member 118 and 136. When the bolts 72 have been cast into the curb slab 40, the outer nuts 180 may be removed to permit removal of the curb form members 118 and 136.

The roadway drains 74 are formed in the curb slabs 40 by mounting blocks 181 at spaced intervals between the outer and inner members 136 and 138 of the upper curb form 120. The blocks 181 may be made of wood or the like. It is preferred to taper the blocks 181, as shown, so that they may easily be removed from the curb slabs 40 after the concrete has set. Of course, the exposed surfaces of the blocks are oiled to facilitate such removal.

In many respects, the side form 116 is similar to the lower curb form 118. Thus, the illustrated side form 116 comprises a channel member having a flat, vertical face 184 directed inwardly toward the curb form 114, together with outwardly directed upper and lower flanges 186 and 188. The lower flange 188 and the base members 84 are apertured to receive pintle bolts 190 adapted to retain the side form 116 in its position between the end forms 100. At each end of the side form 116, a gusset plate 192 is welded or otherwise secured to the upper flange 186 and is arranged to overlap the upper flange of the corresponding end form 100. It will be seen that the plates 192 and the end forms 100 are apertured to receive pintle bolts 194. In order to form the tapered grooves or female elements 56 in the edges of the deck and curb slabs 38 and 40, the side form 116 is provided with a tapered tongue or male element 196. As shown in Fig. 14, the illustrated tongue element 196 takes the form of a tapered, trapezoidally shaped channel member having its flanges welded or otherwise secured against the flat, vertical face 184 of the side form 116. The tapered channel member 196 extends along the side form 116 from end to end and is located midway between the upper and lower edges of the side form.

To facilitate removal of the forms 100, 114 and 116, it is preferred to insert a pair of filler boards 198 (Figs. 8, 11 and 12) between the end forms 100 and the ends of the forms 114 and 116. The boards 198 may be made of thin plywood. The exposed surfaces of the boards 198 and the inner surfaces of the forms 114 and 116 are oiled, in the usual manner, before concrete is cast into the forms. The oiling makes it easy to remove the forms after the concrete has set.

Provision is made for forming the lateral apertures 60 in the deck and curb slabs 38 and 40. It will be recalled that the apertures 60 are adapted to receive the cables 58 employed to clamp the slabs 38 and 40 together. In this, the apertures 60 are formed by round pipes or rods 200 (Fig. 8) adapted to be supported by the side forms 116 and the lower curb forms 118. When the inner curb slab 40 is to be cast, each of the pipes 200 is inserted first through a sleeve 202 on the lower curb form 118 and then through a sleeve 204 on the side form 116. It will be seen from Fig. 15 that the various sleeves 202 are considerably larger than the pipes 200 and are formed with inner end walls 206 having axial apertures 208 which rotatably receive the pipes. The sleeves 202 project a short distance inwardly beyond the lower curb form 118 and are adapted to form the recesses 64 in the curb slabs 40. It will be recalled that the recesses 64 are employed to receive the anchoring devices 62 for the tensioned cables 58. Each of the sleeves 202 is rotatably mounted in a large sleeve or bearing 210 welded or otherwise secured to the lower curb form 118, at a point midway between its upper and lower edges. The sleeves 202 and 210 are apertured to receive a pintle bolt 212 which holds the sleeve 202 in position while concrete is being cast into the forms.

Each guide sleeve 204 on the side form 116 is of a size to receive one of the pipes 200 for free rotation. It will be seen from Fig. 15 that the sleeves 204 extend through the tapered channel 196 and the side form 116 and are welded or otherwise secured to the form.

Before concrete is poured into the forms, the pipes 200 and the sleeves 202 are oiled to prevent the formation of a bond between them and the concrete. When the concrete has set, the pipes 200 and sleeves 202 are rotated to free them from the concrete and are then withdrawn. To provide for easy rotation, each of the pipes 200 has its outer end bent at right angles to form an arm or handle 214. A radial arm or handle 216 is welded or otherwise secured to each of the sleeves 202.

It has already been indicated that holes 66 are formed in the ends of the deck and curb slabs 38 to receive anchoring bolts adapted to secure the slabs to the underlying bridge structure. As shown in Figs. 19–24, it is preferred to embed anchoring plates 220 in the slabs 38 and 40 for engagement by the heads of the anchoring bolts. As shown, the plates 220 are mounted in the lower portions of the slabs and are supported on a pair of longitudinal reinforcing bars or other elements 222, extending longitudinally in the slabs and embedded therein. The plates 220 are preferably welded or otherwise secured to the reinforcing bars 222.

Each of the plates 220 is formed with an aperture 224 aligned with the corresponding hole 66 but of smaller size so that the plate will project into the hole for engagement by the head of the anchoring bolt. In order that the anchor plates 220 may be employed in lifting the slabs 38 and 40, each plate 220 is formed with keyhole slots 226 at diametrically opposite points in the aperture 224. The slots 226 are adapted to admit a cross pin or other key element mounted on a lifting element such as an eye bolt. After the cross pin has been inserted through the slots 226, the bolt may be rotated through 90 degrees to retain the cross pin under the plate 220 during the lifting operation.

Below each plate 220, the hole 66 is reinforced by a short sleeve 228 extending between the plate and the lower surface of the slab. As shown, the sleeve 228 is welded or otherwise secured to the plate 220. It will be recognized that the sleeves 228 support the plates 220 and the reinforcing rods 222 while concrete is being poured. Moreover, the sleeves 228 prevent the slabs from being cracked locally around the holes 66 due to the tightening of the anchor bolts.

In this case, the portion of each hole 66 above the anchor plate 220 is formed by means of a tubular hole form or pipe 230 of a length to extend upwardly from the plate and beyond the upper surface of the slab. The pipe 230 is centered and held upright over the anchoring plate 220 by means of a guide bar 232 of a size to fit snugly in the key hole slots 226. The guide bar 232 extends through the slots to the metal base member 84, which underlies the end portions of the slabs 38 and 40 into which the holes 66 are cast. The tubular hole forms 230 are of a size to slide over the guide bars 232.

To facilitate removal of the hole forms 230 from the slabs, after the concrete has set, each of the hole forms is provided with a pair of radial handles 234. A hole 236 may be formed in the upper end of the guide bar 232 so that the bar may readily be removed. It will be understood that the hole forms 230 are oiled to prevent the formation of a firm bond between them and the concrete.

In preparing to cast the inner curb slab 40, the side form 116 and the lower and upper curb slabs 118 and 120 are placed between the end forms 100 as already described. The various reinforcing elements, including the anchor plates 220 and the rods 48, 49, 50 and 222, are placed in the space defined by the forms. Next, the guide bars 232 are inserted into the keyhole slots 226 in the anchor plates 220 and the hole forms 230 are slipped over the guide bars. The anchor bolts 72 and the recess forming sleeves 202 are mounted on the lower curb form 118 and the pipes 200 are inserted through the sleeves 202 and 204. After all of the components of the forms have been oiled, concrete is poured into the space defined by the end forms 100, the side form 116 and the lower and upper curb forms 118 and 120. The inner deck portion of the curb slab is smoothed off level with the upper edges of the end forms 100 and the side form 116, while the curb portion 46 is smoothed off level with the upper edges of the upper curb form 120.

After the concrete in the curb slab 40 has set, the hole forms 230 are loosened by rotating them with the handles 234. The hole forms 230 and the guide bars 232 are then removed from the slab. Likewise, the pipes 200 and the sleeves 202 are loosened by rotating them with their handles 214 and 216. The pipes 200 and sleeves 202 are then withdrawn from the slab 40.

Next, the outside nuts 180 are removed from the anchor bolts 72. The side form 116 and the lower and upper curb forms 118 and 120 are then removed from the slab. To facilitate the breaking of the bond between the forms and the slab, each of the forms 116, 118 and 120 is provided with a series of break-out hoops, in the form of U-shaped bars 240 welded to the outside of the forms adjacent their upper and lower edges. Such U-shaped break-out bars are also provided on the end forms 100. Pry bars or the like may be inserted through the U-shaped break-out bars 240 to develop sufficient force to break the bond between each of the forms and the newly cast slab.

When the first curb slab 40 has been completed, the first deck slab 38 is cast by moving the side form 116 to a new position, spaced away from the curb slab 40, as shown in Fig. 17. The deck slab 38 is then cast into the space defined by the end forms 100, the side form 116, and the grooved edge of the curb slab 40. Before pouring the concrete, the pipes 200 are inserted first through the sleeves 204 in the side form 116 and then into the apertures 60 already cast in the curb slab 40. The reinforcing elements and the hole forms 230 are added in the same manner as casting the curb form 40.

Next, the various components of the forms and the grooved edge of the curb slab 40 are oiled. Concrete is then poured into the space between the forms and the slab 40 and is leveled off even with the upper extremities of the forms and the slab 40. Once the concrete has set, the pipes 200, hole forms 230 and the side form 116 are removed. It will be understood that the tapered tongue or male element 54 on the deck slab 38 is formed by the tapered groove or female element 56 in the edge of the curb slab 40. Thus, a perfect fit is assured between the joint elements of opposite sex.

The remaining deck slabs 38 are formed in like manner, by casting concrete into the space defined by the end forms 100, the side form 116 and the grooved edge of the preceding slab 38. For each new slab 38, the side form 116 is moved to a new position, spaced from but parallel to the grooved edge of the preceding slab 38, as illustrated in Fig. 18. It will be seen from Fig. 3 that a series of spaced apertures 242 is provided in each of the metal base members 84 to receive the pintle bolts 190 which retain the lower flange of the side form 116 at its various positions. Likewise, a series of spaced apertures 244 is formed in each of the forms 100 to receive the pintle bolts 194 which retain the gusset plates 192 on the upper edge of the side form 116.

While the deck slabs 38 are being cast, the lower and upper curb forms 118 and 120 are not required. However, they may be employed in connection with other set-ups of the precasting apparatus. Thus, a yard may have several precasting set-ups, all served by a single set of curb forms.

The curb forms 118 and 120 are again needed to cast the second curb slab 40 and thereby complete the span. As shown in Fig. 4, the end forms are provided with a second set of apertures 245 for receiving the various pintles and bolts employed to mount the curb forms 118 and 120 between the end forms. The apertures 244 are located to position the curb forms 118 and 120 for casting the second curb slab 40.

Figs. 9 and 10 illustrate the completed span 32 before and after the removal of the forms. Fig. 16 is similar to Fig. 9 on a larger scale. As indicated by the legends in Fig. 16, the curb slab 40 at the lower end of Figs. 9, 10 and 16 is cast first. Then the various deck slabs 38 are cast successively, progressing from bottom to top in the various views. Finally, the second curb slab is cast last.

Once the last curb slab has set, all of the forms are removed. The various slabs 38 and 40 are then separated. Generally it is desirable to store the slabs for a sufficient time to provide for adequate curing of the concrete. The slabs are then transported to the bridge site and are reassembled to form the various spans 32. In reassembling the slabs, it is not necessary to maintain their original order, since the slabs are cast with such perfection that they are fully interchangeable. The tongues and grooves 54 and 56 will fit perfectly because all of them derive their shape from the tongue 196 on the side form 116. The anchoring bolts 68 are mounted in the holes 66 and are partly drawn up. Then the cables 58 are threaded through the aligned lateral apertures 60 and are tensioned to clamp the slabs 38 and 40 into firm edge-to-edge engagement. In this way, the tongues and grooves 54 and 56 will mate securely and will prevent any relative movement between the edges of adjacent slabs. Finally, the anchor bolts 68 are tightened, the railings are mounted on the railing bolts 72, and the bolt holes 66 are filled with grout or asphalt.

A number of additional advantages of the present apparatus should be mentioned specifically. The various forms employed in pouring the deck and curb slabs are rigid so that they will not bulge or distort under the weight of the wet concrete. The forms are securely anchored in place by the various bolts and pintles.

It is a simple matter to change the width and length of the slabs. The width may be changed by boring additional pintle holes in the metal base members 84 and the end forms 100. If the length of the slabs is to be changed, new mounting holes may be bored in the metal base members so that the end forms may be moved to new locations. Curb and side forms of corresponding length may then be provided.

The tongues and grooves formed on the deck and curb slabs are of the proper size and are formed with rounded corners and the proper taper to insure effective load transfer between the adjacent slabs and to prevent relative movement between abutting edges of the slabs. The chamfer strips on the curb forms provide properly chamfered corners on the curb slabs.

The curb form provides a curb of the proper depth and shape and provides for the necessary roadway drains. Moreover, the railing anchor bolts are accurately located. In all of the slabs, the holes for the cables and the anchor bolts are accurately formed.

The bridge spans can be precast with any desired transverse crown by curving the metal base members and laying the concrete pad even with the base members. On the other hand, the base members and the pad may be made without a transverse crown, if a flat roadway is desired. Likewise, the pad may be cast with or without a longitudinal crown by properly shaping the lower edge of the leveling bar employed in smoothing the concrete.

The extensive use of pintle bolts to secure the side and curb forms to the end forms makes it easy to mount and remove the various forms. The break-out bars on the various forms makes it easy to break the bond between the forms and the concrete slabs.

The metal base member underlies the end portions of the deck and curb slabs 38. These end portions are supported on the piers and bents in the finished bridge. Smooth, even surfaces are imparted to these end portions by the metal base members. This insures proper and continuous bearing engagement between the end portions and the piers and bents.

It will be understood that the forms may be used repeatedly to make numerous bridge slabs. If the forms become obsolete due to changes in design, they may be salvaged for structural uses.

With the apparatus of the present invention, precast bridge slabs and other similar precast concrete products may be made very efficiently and economically. The slabs may be made with such precision that they may be assembled interchangeably in the field at extremely low cost. As a result, high quality bridges or the like may be made very economically.

Various modifications, alternative constructions and equivalents may be employed without departing from the true spirit and scope of the invention as exemplified in the foregoing description and defined in the following claims.

We claim:

1. Apparatus for making a precast concrete bridge span comprising a plurality of adjacent deck slabs with curb slabs on the opposite sides of said span and with interfitting tongue and groove joint elements therebetween, said apparatus comprising, in combination, a pair of spaced parallel footings, parallel metal supporting members mounted on said respective footings, each of said members having a substantially smooth upper surface, a plurality of threaded adjustable nut-and-screw elements connected between said footings and said supporting members at spaced points therealong for bending said supporting members to give them a slight upward arch and thereby provide a slight crown on the bridge span, a concrete base laid between said supporting members and flush with said upper surfaces thereof, said base thereby having the same crown as said supporting members, a pair of parallel end forms mounted on said supporting members and having substantially vertical faces directed toward each other, means for removably clamping said end forms downwardly against said supporting members and thereby giving said end forms the same arch as said supporting members, a curb form extending between said end forms adjacent one end thereof and in perpendicular relation thereto, means for removably connecting said curb form to said end forms, a side form extending between said end forms in perpendicular relation thereto and in spaced parallel relation to said curb form, said end forms and said side form having matching locating holes therein, pins receivable in said holes for disengageably securing said side form to said end forms, said side form having a joint element of one sex formed thereon, said forms being adapted to receive concrete cast therein to make a curb slab having a joint element of the opposite sex formed in the inner edge thereof by said joint element on said side form, one of said joint elements comprising a tongue and the other a groove, said end forms having a second set of locating holes therein to receive said pins for disengageably connecting said side form between said end forms in a second position spaced a predetermined distance away from said curb slab to form a deck slab cast into the space defined by said end forms, said side form and said curb slab, said deck slab having joint elements of opposite sex formed on opposite edges thereof by said joint elements on said side form and said curb slab, said end forms having additional sets of locating holes therein to receive said pins for disengageably connecting said side form between said end forms at a series of additional positions spaced along said end forms to form a series of additional deck slabs, means for disengageably connecting said curb form between said end forms adjacent the opposite end thereof for forming a second curb slab, a plurality of hole-forming rods adapted to be cast removably into said slabs to form holes therein, guide elements on said curb form and said side form for receiving said rods in position to pass laterally through said slabs and form aligned lateral holes therein, and apertures in said curb slab for receiving and supporting anchor studs to be cast into the outer edges of said curb slabs.

2. Apparatus for making a precast concrete bridge span comprising a plurality of adjacent deck slabs with curb slabs on the opposite sides of said span and with interfitting tongue and groove joint elements therebetween, said apparatus comprising, in combination, a pair of spaced parallel footings, parallel metal supporting members mounted on said respective footings, each of said members having a substantially flat upper surface, a plurality of threaded adjustable nut-and-screw elements connected between said footings and said supporting members at spaced points therealong for flexing said supporting members to give them a slight upward arch and thereby provide a slight crown on the bridge span, a concrete base laid between said supporting members and flush with said upper surfaces thereof, said base thereby having the same crown as said supporting members, a pair of parallel end forms mounted on said supporting members and having substantially vertical faces directed toward each other, means for removably clamping said end forms downwardly against said supporting members and thereby giving said end forms the same arch as said supporting members, a curb form extending between said end forms adjacent one end thereof and in perpendicular relation thereto, means for removably connecting said curb form to said end forms, a side form extending between said end forms in perpendicular relation thereto and in spaced parallel relation to said curb form, said end forms and said side form having matching locating holes therein, pins receivable in said holes for disengageably securing said side form to said end forms, said side form having a tongue formed thereon, said forms being adapted to receive concrete cast therein to make a curb slab having a groove formed in the inner edge thereof by said joint element on said side form, said end forms having a second set of locating holes therein to receive said pins for disengageably connecting said side form between said end forms in a second position spaced a predetermined distance away from said curb slab to form a deck slab cast into the space defined by said end forms, said side form and said curb slab, said deck slab having a groove and a tongue formed on opposite edges thereof by said tongue and groove on said side form and said curb slab, said end forms having additional sets of locating holes therein to receive said pins for disengageably connecting said side form between said end forms at a series of additional positions spaced along said end forms to form a series of additional deck slabs, means for disengageably connecting said curb form between said end forms adjacent the opposite end thereof for forming a second curb slab, a plurality of hole-forming rods adapted to be cast removably into said slabs to form holes therein, guide elements on said curb form and said side form for receiving said rods in position to pass laterally through said slabs and form aligned lateral holes therein, and apertures in said curb slab for receiving and supporting anchor studs to be cast into the outer edges of said curb slabs.

References Cited in the file of this patent

UNITED STATES PATENTS

| Number | Name | Date |
|---|---|---|
| 124,135 | Hopke | Feb. 27, 1872 |
| 890,769 | Hewett | June 16, 1908 |
| 985,035 | Hotchkiss | Feb. 21, 1911 |
| 1,142,043 | McArthur | June 8, 1915 |
| 1,207,697 | Atterbury | Dec. 12, 1916 |
| 1,880,811 | Clyne | Oct. 4, 1932 |
| 2,016,561 | Richards | Oct. 8, 1935 |
| 2,102,254 | Brockhurst | Dec. 14, 1937 |
| 2,250,839 | Perry | July 29, 1941 |
| 2,286,612 | Flory | June 16, 1942 |
| 2,413,990 | Muntz | June 7, 1947 |
| 2,495,100 | Henderson | Jan. 17, 1950 |
| 2,516,453 | Dobell | July 25, 1950 |
| 2,590,685 | Coff | Mar. 25, 1952 |
| 2,611,169 | Torrelli | Sept. 23, 1952 |
| 2,668,999 | Baechler | Feb. 16, 1954 |
| 2,745,165 | Lewis | May 15, 1956 |
| 2,780,150 | Yeoman | Feb. 5, 1957 |

OTHER REFERENCES

Construction Methods and Equipment, January 1953, pages 54, 55, 56. (Copy in 72–8.)

Engineering News-Record, June 5, 1947, page 7. (Copy in 72–8.)

Engineering News-Record, June 7, 1951, pages 40 and 41. (Copy in 72–8.)